United States Patent [19]

Shiraishi

[11] Patent Number: 5,521,856
[45] Date of Patent: May 28, 1996

[54] MULTIPLIER CAPABLE OF CALCULATING DOUBLE PRECISION, SINGLE PRECISION, INNER PRODUCT AND MULTIPLYING COMPLEX

[75] Inventor: Mikio Shiraishi, Yokohama, Japan

[73] Assignee: Kabushiki Kaisha Toshiba, Kawasaki, Japan

[21] Appl. No.: 326,210

[22] Filed: Oct. 20, 1994

[30] Foreign Application Priority Data

Oct. 21, 1993 [JP] Japan ................................. 5-263724

[51] Int. Cl.$^6$ ................................................ G06F 7/52
[52] U.S. Cl. ................................. 364/760; 364/758
[58] Field of Search ................................. 364/754, 757, 364/758, 760, 750.5

[56] References Cited

U.S. PATENT DOCUMENTS

| | | | |
|---|---|---|---|
| 4,680,727 | 7/1987 | White | 364/754 |
| 4,813,008 | 3/1989 | Shigehara et al. | 364/760 |
| 4,879,677 | 11/1989 | Shiraishi | 364/760 |
| 5,262,976 | 11/1993 | Young et al. | 364/760 |
| 5,420,809 | 5/1995 | Read et al. | 364/715.01 |

FOREIGN PATENT DOCUMENTS

| | | |
|---|---|---|
| 0209446 | 1/1987 | European Pat. Off. . |
| 0239899 | 10/1987 | European Pat. Off. . |
| 62-115538 | 5/1987 | Japan . |

OTHER PUBLICATIONS

Patent Abstracts of Japan, vol. 16, No. 506, Oct. 20, 1992.

*Primary Examiner*—Roy N. Envall, Jr.
*Assistant Examiner*—Chuong D. Ngo
*Attorney, Agent, or Firm*—Finnegan, Henderson, Farabow, Garrett & Dunner

[57] ABSTRACT

An AND gate inputs the most significant bit of a lower word of an multiplicand or "0" to an input terminal of the least significant bit of Booth's decoders to which an upper word of the multiplicand is inputted based on a control signal. An AND gate replaces a part of a partial products with "0" based on the control signal. A selector replaces other part of the partial products with partial products of the lower bits than the other part of the partial products. Whereby, a plurality of pairs of data can be multiplied at one time.

3 Claims, 5 Drawing Sheets

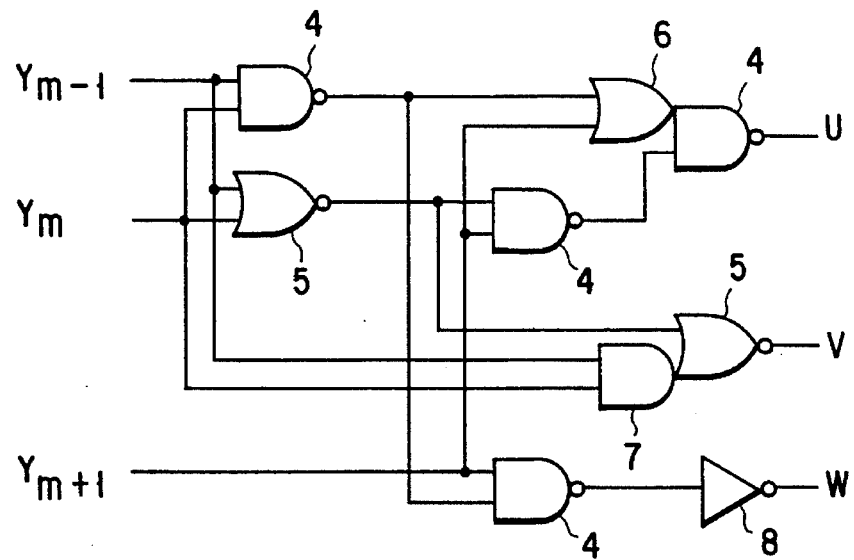
F I G. 2
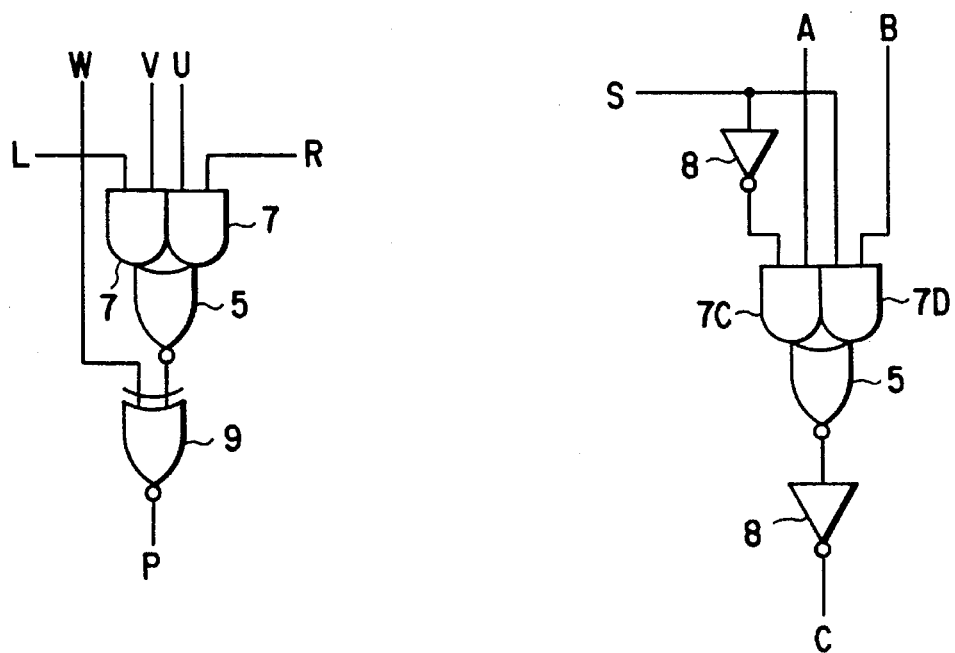
F I G. 3
F I G. 5

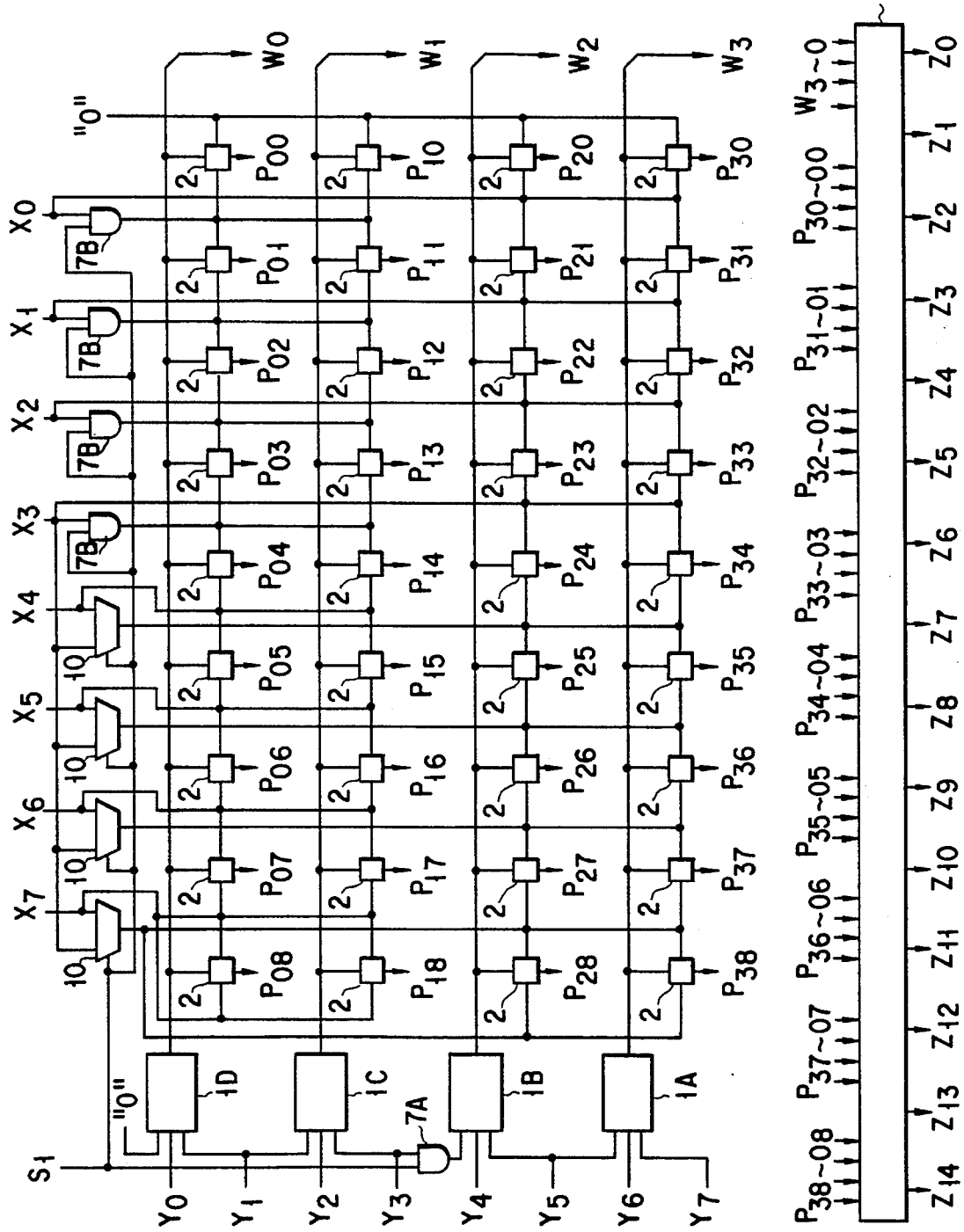
F I G. 4A
F I G. 4B

MULTIPLIER CAPABLE OF CALCULATING DOUBLE PRECISION, SINGLE PRECISION, INNER PRODUCT AND MULTIPLYING COMPLEX

BACKGROUND OF THE INVENTION

1. Field of the Invention

The present invention relates to a multiplier, which is particularly used in a parallel multiplier.

2. Description of the Related Art

FIGS. 1A and 1B show a conventional parallel multiplier using Booth's algorithm. In FIGS. 1A and 1B, reference numeral 1 is a Booth's decoder, 2: a Booth's selector, and 3: a parallel adding circuit for adding partial products.

FIG. 2 shows an example of a circuit forming the Booth's decoder 1 of FIG. 1A. In FIG. 2, reference numeral 4 is an NAND gate, 5: an NOR gate, 6: an OR gate, 7: an AND gate, and 8: an inverter.

FIG. 3 shows an example of a circuit forming the Booth's selector 2 of FIG. 1A. In FIG. 3, reference numeral 9 is an exclusive NOR gate.

Regarding the parallel adding circuit 3, the parallel adding circuit, which is disclosed in Japanese Patent Application KOKAI Publication No. 63-55627, can be used.

Booth's algorithm is algorithm for multiplying a multiplier X and a multiplicand Y, which are expressed by twos complement, together at high speed as shown in equations (1) and (2). In this algorithm, as shown in equation (3), if a value of the multiplicand Y is decoded every three bits by the decoder 1, and each bit of the multiplier X is selected by the selector 2 in accordance with the decoding result, a partial products Pm is generated.

A product Z can be obtained by adding the partial products Pm from m=0 to m=(n/2)−1 as shown in equation (4). According to this algorithm, since the number of the partial products can be reduced to a half of the case in which an array multiplier using an AND gate to generate the partial products, the calculating speed can be increased. Normally, a value of $y_{2m-1}$ is set to 0 when m=0.

$$\text{Multiplier } X = -2^{n-1}x_{n-1} + 2^{n-2}x_{n-2} + \ldots + 2x_1 + x_0 \quad (1)$$

$$\text{Multiplicand } Y = -2^{n-1}y_{n-1} + 2^{n-3}y_{n-2} + \ldots + 2y_1 + y_0 \quad (2)$$

$$\text{PARTIAL PRODUCTS } Pm = X \ (-2y_{2m+1} + y_{2m}y_{2m-1})2^{2m} \quad (3)$$

wherein $y_{-1}=0$.

$$\text{Product } Z = \sum_{m=0}^{n/2-1} P_m \quad (4)$$

In recent years, a portable data communication apparatus has been widely used. As an LSI, which is mounted on the apparatus, an LSI whose consumption of electrical power is low is required so as to prolong a life of a battery. Moreover, in order to deal with noise and an insufficiency of a communication channel capacity, the digital processing is essential, and an LSI for digital signal processing, that is, a digital signal processor (DSP) is mounted on the above apparatus.

By mounting the digital signal processor on the data communication apparatus, highly sophisticated processing can be realized. However, as the processing becomes sophisticated, the following problem rises.

More specifically, the principle of the operation of the digital signal processor is substantially the same as that of a general purpose microprocessor. Due to this, the more the processing becomes complicated, the more the processing time is increased. However, since the processing time has its upper limit, a frequency of an operation clock must be increased in the portable data communication apparatus in which a real time operation is required. However, if the clock frequency is increased, the consumption of electrical power is increased.

The above problem does not meet the requirement of the LSI mounted on the portable data communication apparatus.

As means for preventing such a problem, there is a parallel processing. The parallel process is that a plurality of processings are executed in parallel. An amount of processing within the unit time can be increased without increasing the clock frequency.

However, the basic calculation of the digital signal processing is an operation in which the calculation of the sum of products, that is, the multiplied results are cumulatively added. Therefore, both the multiplier and the adder are built in the digital signal processor.

Moreover, the above-mentioned convention multiplier can multiply only a pair of data at one time. Due to this, for executing the calculation of the sum of products at a double speed by the parallel processing, two multipliers must be built in the digital signal processor. Also, for cumulatively adding the multiplied results, at least two adders must be built therein.

Moreover, for obtaining the final result of the cumulative addition, the results, which are separately added, must be added. Due to this, one more adder must be built in the digital signal processor, or two sets of registers (accumulators) for saving the results, which are separately added, must be prepared.

Furthermore, a compiler having an optimization function is indispensable for using such a paralleled architecture. However, since an object conversion efficiency of the compiler does not suffice, the programming of the digital signal processor is executed by use of a common assembler. Due to this, the paralleled architecture applies an optimization load to the programmer, and efficiency of developing the software is dropped.

Moreover, in the digital signal processing, a problem of a calculation precision always follows. Particularly, this problem is brought about when the DSP for fixed-point calculation is used. An error included in the result of the multiplication is accumulated by the cumulative addition, and the operation of the entire system becomes unstable.

If the double precision calculation is used, the problem of the precision is improved. However, the circuit scale of the double precision multiplier is four times as large as that of the single precision multiplier, an area occupancy ratio of the double precision multiplier to the LSI is increased. In addition, the conventional multiplier is used, the plurality of the multipliers are needed in parallel processing for the above-mentioned reason. Therefore, such multipliers are not suitable in practical use.

As mentioned above, the conventional multiplier has the following disadvantages.

The more the processing becomes complicated, the more the clock frequency must be increased, and the consumption of the electrical power is increased. The provision of the parallel processing enlarges the circuit scale of the digital signal processor. The paralleled architecture applies an optimization toad to the programmer.

SUMMARY OF THE INVENTION

In order to solve the above-mentioned disadvantages, an object of the present invention is to provide a multiplier, which can multiply a plurality of pairs of data at one time without increase in the consumption of electrical power and increase in the circuit scale.

In order to attain the above object, according to a first aspect of the present invention, there is provided a multiplier using Booth's algorithm comprising a first Booth's decoder for inputting a host word of a multiplicand thereto; a second Booth's decoder for inputting a lower word of the multiplicand thereto; multiplicand dividing means for inputting the most significant bit of the lower word of the multiplicand or "0" to an input terminal of the least significant bit of the first Booth's decoder; zeroising means for replacing a part of partial products with "0"; and bit extension means for replacing the other part of the partial products with one bit of the partial products of lower bits than the other part of the partial products.

Also, the most significant bit of the lower word of the multiplicand is inputted to an input terminal of the most significant bit of the first Booth's decoder by the multiplicand dividing means, and the zeroising means and the bit extension means are not functioned, whereby multiplying a single precision or that of a double precision.

Moreover, $a_1$ and $a_0$ are inputted to the host word of the multiplier and the lower word, respectively, $b_0$ and $b_1$ are inputted to the host word of the multiplicand and the lower word, respectively, "0" is inputted to the input terminal of the least significant bit of the first Booth's decoder by the multiplicand dividing means, and the zeroising means and the bit extension means are functioned, whereby obtaining inner products of vector $A=(a_0, a_1)$ and vector B $(b_0, b_1)$.

According to a second aspect of the present invention, there is provided a multiplier using Booth's algorithm comprising: a first Booth's decoder for inputting a host word of a multiplicand thereto; a second Booth's decoder for inputting a lower word of the multiplicand thereto; multiplicand complementing means for inputting "0" or "1" to an input terminal of the least significant bit of the second Booth's decoder, and for inputting the lower word of the multiplicand or the reversed signal to the second Booth's decoder; multiplicand dividing means for inputting the most significant bit of the lower word of the multiplicand or "0" to the input terminal of the least significant bit of the first Booth's decoder; zeroising means for replacing a part of partial products with "0" ; and bit extension means for replacing the other part of the partial products with one bit of the partial products of lower bits than the other part of the partial products.

Also, b and a are inputted to the host word of the multiplier and the lower word of the multiplier, respectively, c and d are inputted to the host word of the multiplicand and the lower word of the multiplicand, respectively, "1" is inputted to the input terminal of the least significant bit of the second Booth's decoder by the multiplicand complementing means, the reversed signal of the lower word of the multiplicand is inputted to the second Booth's decoder by the multiplicand complementing means, "0" is inputted to the input terminal of the least significant bit of the first Booth's decoder by the multiplicand dividing means, and the zeroising means and the bit extension means are functioned, whereby a real part of the products of two complex numbers F=a+jb and G=c+jd is calculated.

Moreover, a and b are inputted to the host word of the multiplier and the lower word of the multiplier, respectively, c and d are inputted to the host word of the multiplicand and the lower word of the multiplicand, respectively, "0" is inputted to the input terminal of the least significant bit of the second Booth's decoder by the multiplicand complementing means, the lower word of the multiplicand is inputted to the second Booth's decoder by the multiplicand complementing means, "0" is inputted to the input terminal of the least significant bit of the first Booth's decoder by the multiplicand dividing means, and the zeroising means and the bit extension means are functioned, whereby an imaginary part of the products of two complex numbers F=a+jb and G=c+jd is calculated.

According to a third aspect of the present invention, there is provided a multiplier using Booth's algorithm comprising: a first Booth's decoder for inputting a host word of a multiplicand thereto; a second Booth's decoder for inputting a lower word of the multiplicand thereto; multiplicand dividing means for inputting the most significant bit of the lower word of the multiplicand or "1" to the input terminal of the least significant bit of the first Booth's decoder; reversing means for inputting the host word of the multiplicand or the reversed signal to the first Booth's decoder; zeroising means for replacing a part of partial products with "0"; and bit extension means for replacing the other part of the partial products with one bit of the partial products of lower bits than the other part of the partial products.

Also, a and b are inputted to the host word of the multiplier and the lower word of the multiplier, respectively, d and c are inputted to the host word of the multiplicand and the lower word of the multiplicand, respectively, a reserved signal of the host word of the multiplicand is inputted to the first Booth's decoder by the multiplicand complementing means, "0" is inputted to the input terminal of the least significant bit of the first Booth's decoder by the multiplicand complementing means, and the zeroising means and the bit extension means are functioned, whereby a real part of the products of two complex numbers F=a+jb and G=c+jd is calculated.

Moreover, a and b are inputted to the host word of the multiplier and the lower word of the multiplier, respectively, c and d are inputted to the host word of the multiplicand and the lower word of the multiplicand, respectively, the host word of the multiplicand is inputted to the first Booth's decoder by the multiplicand complementing means, "0" is inputted to the input terminal of the least significant bit of the first Booth's decoder by the multiplicand dividing means, and the zeroising means and the bit extension means are functioned, whereby an imaginary part of the products of two complex numbers F=a+jb and G=c+jd is calculated.

According to the above-mentioned structure of the present invention, the part of the partial products generated in the multiplier is zeroising, and the other part of the partial products is replaced with one bit of the partial products lower than the other part of the partial products, whereby the plurality of pairs of data can be multiplied by one multiplier.

Moreover, since multiplication of a plurality of pairs of data can be performed at one time, not only normal multiplication but also the double precision multiplication, the inner product of the vector, and the complex multiplication can be performed by one multiplier.

In a case that the multiplier of the present invention is incorporated into the processor, the above all calculations can be performed by a single machine cycle, so that the number of steps of program can be reduced. Particularly, the number of steps can be reduced to about ½ of the conventional case in the signal processing program in which the calculation of the sum of product is mainly performed.

Moreover, in a case where the calculation through put is the same, the machine cycle is set to be longer than the conventional case, and the consumption of the electrical power of the entire processor can be reduced. Particularly, in the digital signal processor in which the signal processing is dedicatedly performed, the consumption of the electrical power can be reduced to about ½ of the conventional case.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a circuit diagram showing one example of a Booth's decoder 1 used in the conventional multiplier;

FIG. 3 is a circuit diagram showing one example of a Booth's decoder 2 used in the conventional multiplier;

FIGS. 4A and 4B are block diagrams showing a multiplier of a first embodiment of the present invention;

FIG. 5 is a circuit diagram showing one example of a selector 10 used in the multiplier of the present invention;

DETAILED DESCRIPTION OF THE PREFERRED EMBODIMENTS

Figures 1A, 1B:
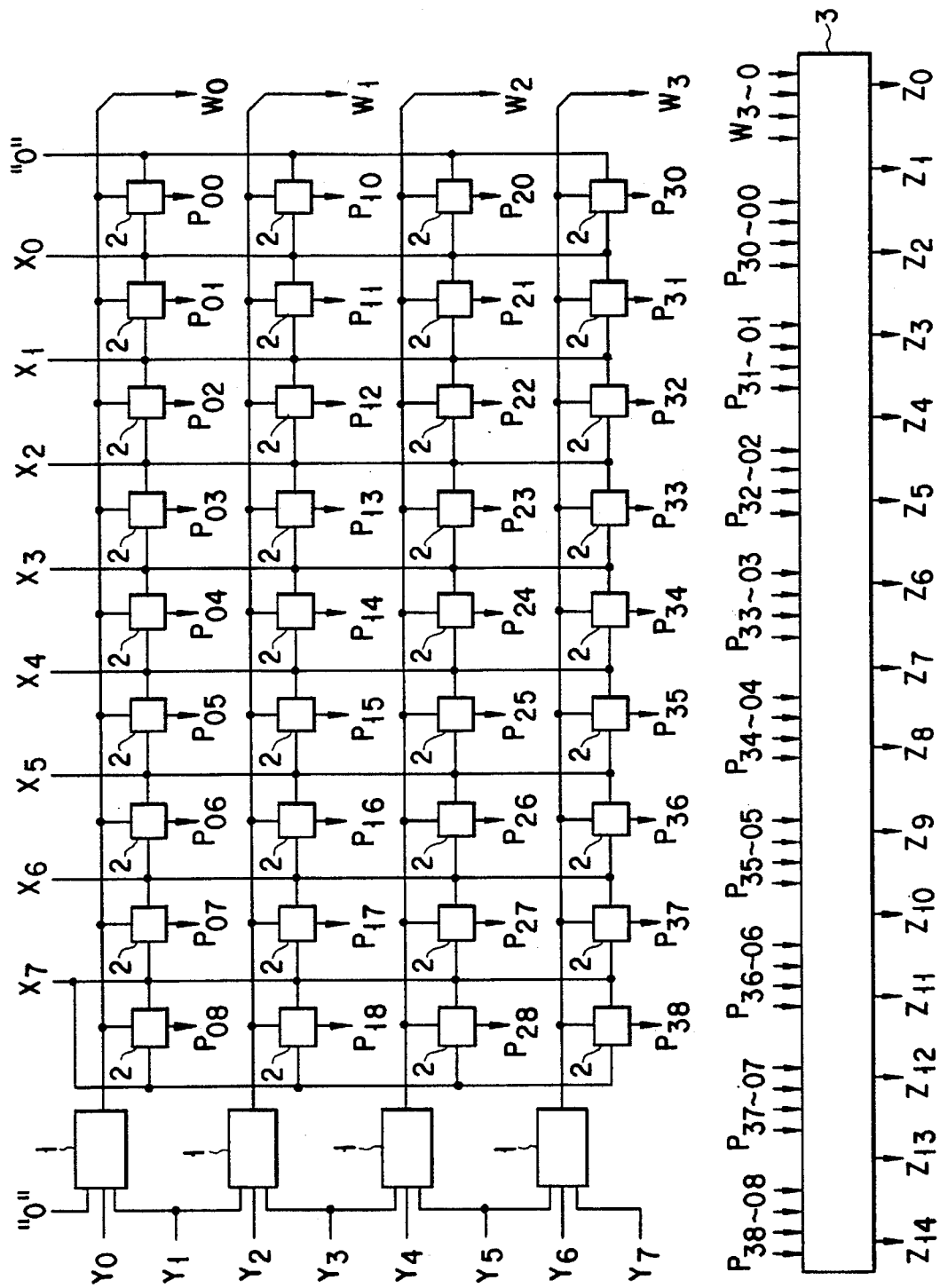
FIGS. 1A and 1B are block diagrams showing a conventional multiplier.

The multiplier of the present invention will be explained with reference to the drawings.

[A] First Embodiment

FIGS. 4A and 4B show a multiplier of a first embodiment of the present invention. In FIGS. 4A and 4B, 1A to 1D are Booth's decoders, 2: a Booth's selector, 3: a parallel addition circuit for adding partial products, 7A and 7B: AND gates, and 10: a selector.

FIG. 5 is a circuit diagram showing one example of the selector 10 used in the multiplier of the present invention. In FIG. 5, 5: a NOR gate, 7C and 7D: AND gates, and 8: an inverter.

Host words $Y_7$ to $Y_4$ of an multiplicand are inputted to the Booth's decoders 1A and 1B. More specifically, the respective bits $Y_7$ to $Y_5$ of the multiplicand are inputted to the Booth's decoder 1A, the respective bits $Y_5$ to $Y_4$ of the multiplicand are inputted to the Booth's decoder 1B.

The NAND circuit (multiplicand dividing means) 7A serves to input the most significant bit $Y_3$ of the lower words $Y_3$ to $Y_0$ of the multiplicand or "0" to an input terminal of the least significant bit of the Booth's decoder 1B. A control signal $S_1$ controls to output whether the most significant bit $Y_3$ of the lower words of the multiplicand or "0."

The lower words $Y_3$ to $Y_0$ of the multiplicand are inputted to the Booth's decoders 1C and 1D. More specifically, the respective bits $Y_3$ to $Y_1$ of the multiplicand are inputted to the Booth's decoder 1C, the respective bits $Y_1$ to $Y_0$ of the multiplicand and "0" are inputted to the Booth's decoder 1D.

The NAND circuit (zeroising means) 7B replaces a part of the partial products, for example, $P_{03}$ to $P_{00}$, $P_{13}$ to $P_{10}$, with "0." In other words, if the control signal $S_1$ is set to "0", all output signals of the NAND circuit 7B are "0", and the part of the partial products ($P_{03}$ to $P_{00}$, $P_{13}$ to $P_{10}$) are changed to "0."

The selector (bit extending means) 10 replaces the other part of the partial products, for example, $P_{28}$ to $P_{25}$ with one bit of the partial products ($P_{24}$) of the lower bits. Moreover, the selector 10 replaces the other part of the partial products, for example, $P_{38}$ to $P_{35}$ with one bit of the partial products ($P_{34}$) of the lower bits.

In other words, when the control signal $S_1$ is "0", the selector 10 selects a multiplier $X_3$, and outputs the multiplier $X_3$. As a result, the other part of the partial products ($P_{28}$ to $P_{24}$, $P_{38}$ to $P_{34}$) are changed to $X_3$ or $\overline{X_3}$.

The following will explain an operation of the multiplier of FIGS. 4A and 4B.

As shown in equations (5) and (6), each of the multiplier X and the multiplicand Y is divided to the host word and the lower word.

$$\text{(Multiplier)} \ X = X_H + X_L \qquad (5)$$

$$\text{(Multiplicand)} \ Y = Y_H + Y_L \qquad (6)$$

At this time, a product Z can be expressed by equation (7)

$$\begin{aligned}\text{(Product)} \ Z &= (X_H + X_L)(Y_H + Y_L) \\ &= X_H Y_H + X_H Y_L + X_L Y_H + X_L Y_L\end{aligned} \qquad (7)$$

The host word $X_{7-4}$ of the multiplier of FIG. 4 corresponds to $X_H$, and the lower word $X_{3-0}$ corresponds to $X_L$. The host word $Y_{7-4}$ of the multiplicand of FIGS. 4A and 4B corresponds to $Y_H$, and the lower word $X_{3-0}$ corresponds to $Y_L$. Also, $S_1$ is a control signal.

According to this embodiment, input data is processed word by word, and the control signal $S_1$ is switched, thereby making it possible to execute three types of multiplications, that is, a single precision, a double precision, and an inner product.

The following will explain the multiplications of the single, double precision, and inner product in order.

[Single Precision]

First of all, the lower words $X_L$ and $Y_L$ of the multiplier and the multiplicand are set to $X_L$="0" and $Y_L$="0", second fourth terms of equation (7) are all "0."

To obtain $X_L$="0" and $Y_L$="0", the lower word $X_{3-0}$ of the multiplier and the lower word $Y_{3-0}$ of the multiplicand may be respectively set to "0" wherein the control signal $S_1$="1" in FIGS. 4A and 4B.

At this time, the product Z can be expressed by the following equation (8).

$$\text{(Single precision)} \ Z = X_H Y_H \qquad (8)$$

When the control signal $S_1$="1", the multiplier of this embodiment performs the same operation as the conventional multiplier of FIGS. 1A and 1B.

In other words, each selector 10 selects input data $X_7$, $X_6$, $X_5$, and $X_4$, and each of the AND gates 7A and 7B directly outputs the level of the other input signal since the control signal S1, which is inputted to one input terminal, is "1."

Under this state, if the host word $X_H$ of the multiplier and the host word $Y_H$ of the multiplicand, that is, $X_{7-4}$ and $Y_{7-4}$ are set to 4 bit single precision data, the multiplication result of the single precision can be obtained.

When input data is fixed-point data, the position of the decimal point of output data is placed between $Z_{14}$ and $Z_{13}$. When input data is integer data, the position of the decimal point of output data is placed between $Z_8$ and $Z_7$.

[Double Precision]

The calculation is directly performed based on equation (7).

If the control signal $S_1$="1", the multiplier of this embodiment performs the same operation as the conventional multiplier of FIGS. 1A and 1B. Due to this, if $X_{7-0}$ and $Y_{7-0}$ are set to 8 bit double precision data, respectively, the multiplication result (output data) of the double precision can be obtained.

When input data is fixed-point data, the position of the decimal point of output data is placed between $Z_{14}$ and $Z_{13}$. When input data is integer data, the position of the decimal point of output data is placed right below $Z_0$.

[Inner Product]

The inner products of two vectors, $\vec{A}=(a_0, a_1)$ and $\vec{B}=(b_0, b_1)$ can be calculated as follows.

First of all, in equation (7), the multiplication is performed in the following condition (equation (9)).

$$X_H=a_1, X_L=a_0, Y_H=b_0, Y_L=b_1 \quad (9)$$

As a result, the following equation (10) can be obtained.

$$Z=a_1b_0+a_1b_1+a_0b_0+a_0b_1 \quad (10)$$

In equation (10), if the first and fourth terms are set to "0" in the multiplier, the following equation (11) can be obtained and the inner products of the vectors $\vec{A}$ and $\vec{B}$ are calculated.

$$\text{(Inner Product) } Z=a_1b_1+a_0b_0 \quad (11)$$

In order to execute equation (9), $a_1$ and $a_0$ are inputted to the host word $X_{7-4}$ of the multiplier and the lower word $X_{3-0}$, respectively, as four bit data. Moreover, $b_0$ and $b_1$ are inputted to the host word $Y_{7-4}$ of the multiplicand and the lower word $Y_{3-0}$, respectively, as four bit data.

The operation in which the first and fourth terms are set to "0" in the multiplier in equation (10) corresponds to the point that the signal control is set to $S_1$="0."

At this time, the AND gates 7A and 7B output "0", and the selector 10 outputs an sign bit $X_3$ of the lower word $X_L$ of the multiplier.

Therefore, both right and left input signals L and R of the selector 2 of the Booth's, which generates the partial products $P_{03}$ to $P_{00}$, $P_{13}$ to $P_{10}$ corresponding to the $X_L Y_L = a_0 b_1$, become "0." Moreover, both right and left input signals L and R of the Booth's selector 2 which generates the partial products $P_{28}$ to $P_{24}$, $P_{38}$ to $P_{34}$ corresponding to the $X_H Y_H = a_1 b_0$, become the sign bit $X_3$ or $\overline{X_3}$.

Moreover, in place of $Y_3$, "0" is inputted to the input terminal of the least significant bit input $Y_{m-1}$ of the Booth's decoders 1A and 1B to which the host word $Y_H = b_0$ of the multiplicand Y is inputted. Due to this, the host word $Y_H = b_0$ of the multiplicand Y and the lower word $Y_L = b_1$ are decoded as an independent 4-bit value.

As a result, the first and fourth terms of equation (7), that is, the first and fourth terms of equation (10) become "0", and the value of equation (11) is outputted.

When input data is fixed-point data, the position of the decimal point of output data is placed between $Z_{10}$ and $Z_9$. When input data is integer data, the position of the decimal point of output data is placed between $Z_4$ and $Z_3$.

The above point means that no overflow is generated in the calculation of the inner product. More specifically, in general, there is possibility that overflow will be generated one bit in the multiplication and one bit in addition. Since two multiplications and one addition are performed in the calculation of the inner product, the number of digits of the overflow is 3 bits in all.

According to the present invention, the sign extension of the host bit rather than the sign bit is performed by the number of bits of each of host and lower words. Therefore, if the number of bits of each word is larger than two bits, no overflow is generated.

[B] Second Embodiment

Figures 6A, 6B:
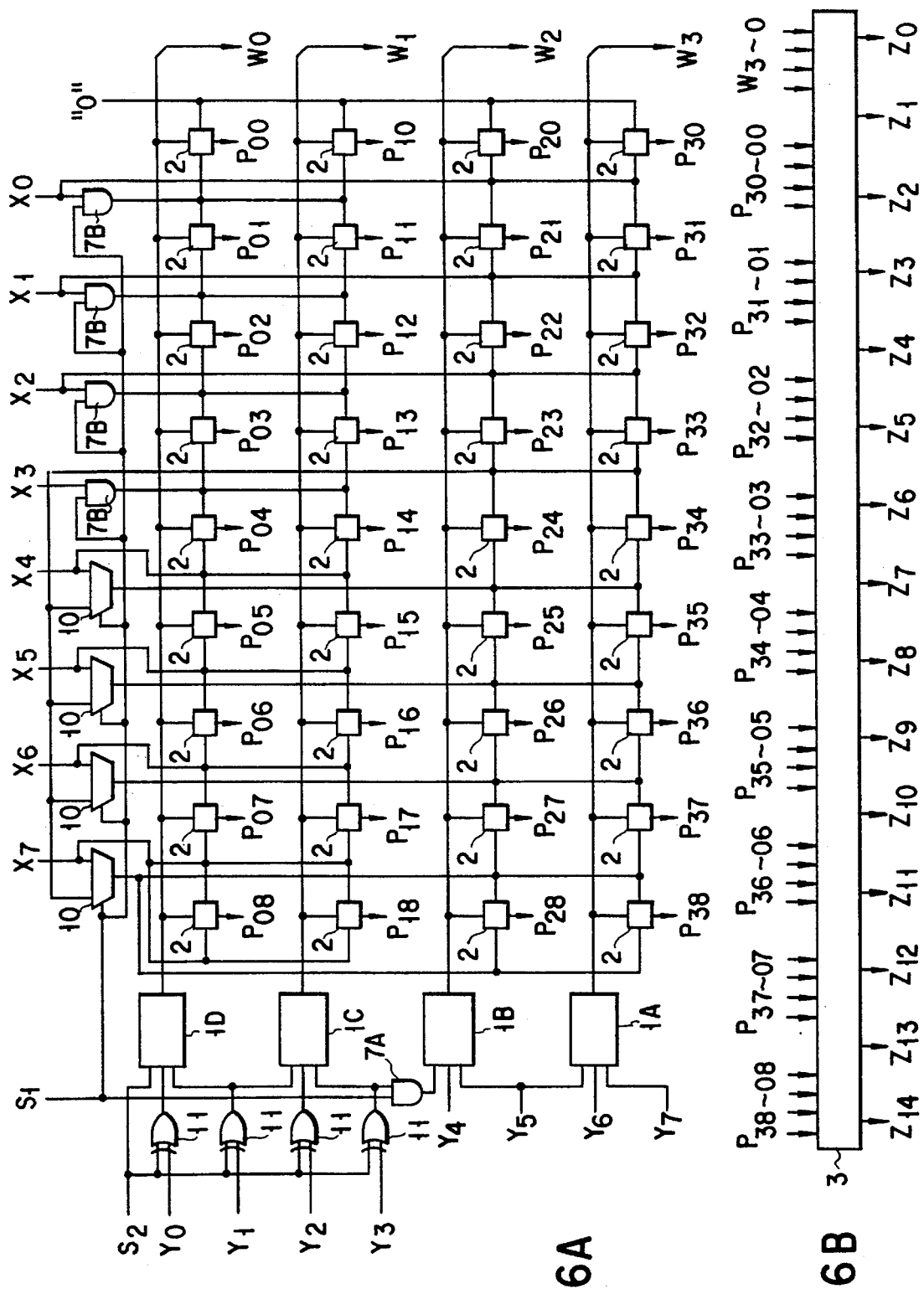
FIGS. 6A and 6B are block diagrams showing a multiplier of a second embodiment of the present invention.

FIGS. 6A and 6B show a multiplier of a second embodiment of the present invention. In FIGS. 6A and 6B, reference numeral 11 is an exclusive OR gate, and $S_2$ is a control signal. The same reference numerals are added to the same structural elements as FIGS. 4A and 4B, and the explanation is omitted.

The host words $Y_7$ to $Y_4$ of the multiplicand are inputted to the Booth's decoders 1A and 1B. More specifically, the respective bits $Y_7$ to $Y_5$ of the multiplicand are inputted to the Booth's decoder 1A, and the respective bits $Y_5$ to $Y_4$ of the multiplicand are inputted to the Booth's decoder 1B.

The AND circuit (multiplicand dividing means) 7A serves to input the most significant bit $Y_3$ of the lower words $Y_3$ to $Y_0$ of the multiplicand or "0" to the input terminal of the least significant bit of the Booth's decoder 1B. The control signal $S_1$ controls whether the AND circuit 7A outputs whether the most significant bit $Y_3$ of the lower words of the multiplicand or "0."

The lower words $Y_3$ to $Y_0$ of the multiplicand and a control signal $S_2$ are inputted to the Booth's decoders 1C and 1D. More specifically, the respective bits $Y_3$ to $Y_1$ of the multiplicand are inputted to the Booth's decoder 1C, and the respective bits $Y_1$ to $Y_0$ of the multiplicand and the control signal $S_2$ are inputted to the Booth's decoder 1D.

The control signal $S_2$ ("0" or "1") is inputted to the input terminal of the least significant bit of the Booth's decoders 1C and 1D. The exclusive OR gate (multiplicand complementing means) 11 has a function for inputting the lower words $Y_3$ to $Y_0$ of the multiplicand or the reverse signal are inputted to the Booth's decoders 1C and 1D. The exclusive OR gate 11 is controlled by the control signal $S_2$.

The AND circuit (zeroising means) 7B replaces a part of the partial products, for example, $P_{03}$ to $P_{00}$, $P_{13}$ to $P_{10}$, with "0." In other words, if the control signal $S_1$ is set to "0", all output signals of the AND circuit 7B are "0", and the part of the partial products ($P_{03}$ to $P_{00}$, $P_{13}$ to $P_{10}$) are changed to "0."

The selector (bit extending means) 10 replaces the other part of the partial products, for example, $P_{28}$ to $P_{25}$ with one bit of the partial products ($P_{24}$) of the lower bits. Moreover, the selector 10 replaces the other part of the partial products, for example, $P_{38}$ to $P_{35}$ with one bit of the partial products ($P_{34}$) of the lower bits.

In other words, when the control signal $S_1$ is "0", the selector 10 selects the multiplier $X_3$, and outputs the multiplier $X_3$. As a result, the other part of the partial products ($P_{28}$ to $P_{24}$, $P_{38}$ to $P_{34}$) are changed to $X_3$ or $\overline{X_3}$.

The following will explain an operation of the multiplier of FIGS. 6A and 6B. According to the multiplier of this embodiment, when the control signal S2 is "0", the same operation as the multiplier of FIG. 4A and 4B is performed. However, when the control signal S2 is "1", the code of the lower word YL of the multiplicand Y is reversed. By use of this point, the complex multiplication is executed. It is assumed that the product of the following two complex numbers will be calculated.

$$F = a + jb$$

$$G = c + jd$$

[Real part]

A real part of the product can be calculated as follow.

First of all, in equation (7), the multiplication is performed in the following condition (equation (12)).

$$X_H = b, X_L = a, Y_H = c, Y_L = -d \qquad (12)$$

As a result, the following equation (13) can be obtained.

$$Z = bc + b(-d) + ac + a(-d) \qquad (13)$$

If the first and fourth terms of equation (13) are set to "0" in the multiplier, the following equation (14) can be obtained, and the real part of the product of the complex numbers F and G is calculated.

$$(\text{Real part}) \quad Z = ac - bd \qquad (14)$$

In order to execute equation (12), b is inputted to the host word $X_{7-4}$ of the multiplier, a is inputted to the lower word $X_{3-0}$, c is inputted to the host word $Y_{7-4}$ of the multiplicand, and d is inputted to the lower word $Y_{3-0}$ of the multiplicand, respectively, as four bit data. Moreover, $S_2$ may be set to $S_2 = $ "1."

If the control signal $S_2$ is set to "1", the code of each bit of the lower word $Y_{3-0}$ ($Y_L = d$) of the multiplicand is reversed by the exclusive OR gate 11, and $S_2 = $ "1" is inputted to the least significant bit $Y_{m-1}$ of the Booth's decoders 1C and 1D to which the lower word $Y_{3-0}$ of the multiplicand is inputted. In other words, the code of the lower word $Y_{3-0}$ ($Y_L = d$) of the multiplicand is reversed to $Y_L = -d$.

The above method for reversing the code of the multiplicand is disclosed in, for example, U.S. Pat. No. 4,813,008.

The operation of setting the first and fourth terms of equation (13) to "0" corresponds to the operation of setting the control signal $S_1$ of the internal of the multiplier to "0." At this time, the AND gates 7A and 7B output "0", and the selector 10 outputs the code bit $X_3$ of the lower word $X_L$ of the multiplier.

Therefore, "0" is inputted to each of the right and left inputs L and R of the Booth's selector 2 for generating the partial products $P_{03}$ to $P_{00}$ and $P_{13}$ to corresponding to $X_L Y_L = a(-d)$. Also, code bit $X_3$ is inputted to each of the right and left inputs L and R of the Booth's selector 2 for generating the partial products $P_{28}$ to $P_{24}$ and $P_{38}$ to $P_{34}$ corresponding to $X_H Y_H = bc$.

Moreover, in place of $Y_3$, "0" is inputted to the least significant bit input $Y_{m-1}$ of the decoders 1A and 1B of the Booth's to which the host words $Y_7$ to $Y_4$ of the multiplicand are inputted. Therefore, the host word $Y_H = c$ of the multiplicand and the lower word $Y_L = d$ are decoded as an independent four bit value.

As a result, the first and fourth terms of equation (7), that is, the first and fourth terms of equation (13) become "0", and a value of equation (14) is outputted.

When input data is fixed-point data, the position of the decimal point of output data is placed between $Z_{10}$ and $Z_9$. When input data is integer data, the position of the decimal point of output data is placed between $Z_4$ and $Z_3$.

In this case, the sign extension of the host bit rather than the sign bit is performed by the number of bits of each word.

Therefore, if the number of bits of each word is larger than two bits, no overflow is generated.

[Imaginary part]

An imaginary part of the product can be calculated as follow. First of all, in equation (7), the multiplication is performed in the following condition (equation (15)).

$$X_H = a, X_L = b, Y_H = c, Y_L = d \qquad (15)$$

As a result, the following equation (16) can be obtained.

$$Z = ac + ad + bc + bd \qquad (16)$$

If the first and fourth terms of equation (16) are set to "0" in the multiplier, the following equation (17) can be obtained and the imaginary part of the products of the complex numbers F and C are calculated.

$$(\text{Imaginary part}) \quad Z = ad + bc \qquad (17)$$

In order to execute equation (15), a is inputted to the host word $X_{7-4}$ of the multiplier, b is inputted to the lower word $X_{3-0}$ of the multiplier, c is inputted to the host word $Y_{7-4}$ of the multiplicand, and d is inputted to the lower word $Y_{3-0}$ of the multiplicand, respectively, as four bit data. Moreover, $S_2$ may be set to $S_2 = $ "0."

If the control signal $S_2$ is set to "0", the exclusive OR gate 11 directly outputs the level of the lower word $Y_{3-0}$ of the multiplicand, and $S_2 = $ "0" is inputted to the least significant bit $Y_{m-1}$ of the Booth's decoders 1C and 1D to which the lower word $Y_{3-0}$ of the multiplicand is inputted.

In other words, the code of the lower word $Y_{3-0}$ ($Y_L = d$) of the multiplicand is not reversed.

The operation of setting the first and fourth terms of equation (16) to "0" corresponds to the operation of setting the control signal $S_1$ of the internal of the multiplier to "0."

At this time, the AND gates 7A and 7B output "0", and the selector 10 outputs the code bit $X_3$ of the lower word $X_L$ of the multiplier. Therefore, "0" is inputted to both right and left inputs L and R of the Booth's selector 2 for generating the partial products $P_{03}$ to $P_{00}$ and $P_{13}$ to $P_{10}$ corresponding to $X_L Y_L = bd$. Also, code bit $X_3$ is inputted to both right and left inputs L and R of the Booth's selector 2 for generating the partial products $P_{28}$ to $P_{24}$ and P 38 to $P_{34}$ corresponding to $X_H Y_H = ac$.

Moreover, in place of $Y_3$, "0" is inputted to the least significant bit input $Y_{m-1}$ of the Booth's decoders 1A and 1B to which the host words $Y_H$ of the multiplicand is inputted. Therefore, the host word $Y_H = c$ of the multiplicand and the lower word $Y_L = d$ are decoded as an independent four bit value.

As a result, the first and fourth terms of equation (7), that is, the first and fourth terms of equation (16) become "0", and a value of equation (17) is outputted.

When input data is fixed-point data, the position of the decimal point of output data is placed between $Z_{10}$ and $Z_9$. when input data is integer data, the position of the decimal point of output data is placed between $Z_4$ and $Z_3$.

In this case, if the number of bits of each word is larger than two bits, no overflow is generated.

[B] Third Embodiment

Figures 7A, 7B:
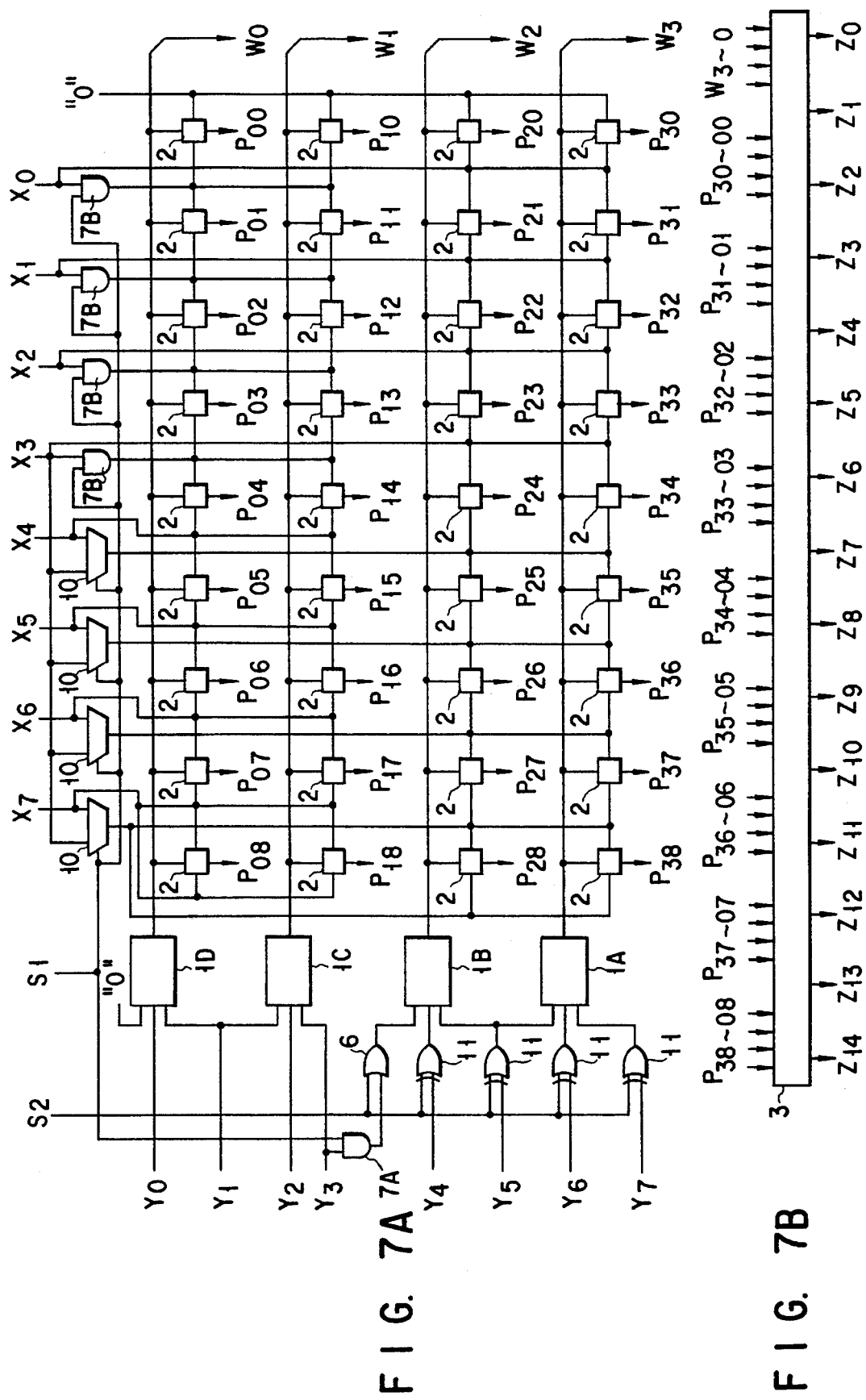
FIGS. 7A and 7B are block diagrams showing a multiplier of a third embodiment of the present invention.

FIGS. 7A and 7B show a multiplier of a third embodiment of the present invention. In FIG. 7A and 7B, reference numeral 6 is an OR gate, and $S_2$ is a control signal. The same reference numerals are added to the same structural elements as the multiplier of FIGS. 4 and 6, and the explanation is omitted.

The host words $Y_7$ to $Y_4$ of the multiplicand are inputted to the Booth's decoders 1A and 1B. More specifically, the respective bits $Y_7$ to $Y_5$ of the multiplicand are inputted to the Booth's decoder 1A, and the respective bits $Y_5$ to $Y_4$ of the multiplicand are inputted to the Booth's decoder 1B.

The OR circuit (multiplicand dividing means) 6 and the AND circuit (multiplicand dividing means) 7A serve to input the most significant bit $Y_3$ of the lower words $Y_3$ to $Y_0$ of the multiplicand or "0" to the input terminal of the least significant bit of the Booth's decoder 1B. The control signals $S_1$ and $S_2$ control whether the AND circuit 7A outputs whether the most significant bit $Y_3$ of the lower words of the multiplicand or "0."

The lower words $Y_3$ to $Y_0$ of the multiplicand and "0" are inputted to the Booth's decoders 1C and 1D. More specifically, the respective bits $Y_3$ to $Y_1$ of the multiplicand are inputted to the Booth's decoder 1C, and the respective bits $Y_1$ to $Y_0$ of the multiplicand and "0" are inputted to the Booth's decoder 1D.

The exclusive OR gate (multiplicand complementing means) 11 has a function for inputting the host words $Y_7$ to $Y_4$ of the multiplicand or the reverse signal are inputted to the Booth's decoders 1A and 1B. The exclusive OR gate 11 is controlled by the control signal $S_2$.

The AND circuit (zeroising means) 7B replaces a part of the partial products, for example, $P_{03}$ to $P_{00}$, $P_{13}$ to $P_{10}$, with "0." In other words, if the control signal $S_1$ is set to "0", all output signals of the AND circuit 7B are "0", and the part of the partial products ($P_{03}$ to $P_{00}$, $P_{13}$ to $P_{10}$) are changed to "0."

The selector (bit extending means) 10 replaces the other part of the partial products, for example, $P_{28}$ to $P_{25}$ with one bit of the partial products ($P_{24}$) of the lower bits. Moreover, the selector 10 replaces the other part of the partial products, for example, $P_{38}$ to $P_{35}$ with one bit of the partial products ($P_{34}$) of the lower bits. In other words, when the control signal $S_1$ is "0", the selector 10 selects the multiplier $X_3$, and outputs the multiplier $X_3$. As a result, the other part of the partial products ($P_{28}$ to $P_{24}$, $P_{38}$ to $P_{34}$) are changed to $X_3$ or $X_3$.

The following will explain an operation of the multiplier of FIGS. 7A and 7B.

According to the multiplier of this embodiment, when the control signal $S_2$ is "0", the same operation as the multiplier of FIGS. 4A and 4B is performed. However, when the control signal $S_2$ is "1", the code of the lower word $Y_L$ of the multiplicand Y is reversed. By use of this point, the complex multiplication is executed.

It is again assumed that the product of the following two complex numbers will be calculated.

$$F=a+jb$$

$$G=c+jd$$

[Real part]

A real part of the product can be calculated as follow.

First of all, in equation (7), the multiplication is performed in the following condition (equation (18)).

$$X_H=a, X_L=b, Y_H=-d, Y_L=c. \tag{18}$$

As a result, the following equation (19) can be obtained.

$$Z=a(-d)+ac+b(-d)+bc \tag{19}$$

If the first and fourth terms of equation (19) are set to "0" in the multiplier, the following equation (20) can be obtained, and the real part of the products of the complex numbers F and G are calculated.

$$(\text{Real part}) \; Z=ac-bd \tag{20}$$

In order to execute equation (18), a is inputted to the host word $X_{7-4}$ of the multiplier, b is inputted to the lower word $X_{3-0}$, d is inputted to the host word $Y_{7-4}$ of the multiplicand, and c is inputted to the lower word $Y_{3-0}$ of the multiplicand, respectively, as four bit data. Moreover, $S_2$ may be set to $S_2$="1."

If the control signal $S_2$ is set to "1", each bit of the host word $Y_{7-4}$ ($Y_H$=d) of the multiplicand is reversed by the exclusive OR gate 11, and the output (="1") of the OR gate 6 is inputted to the least significant bit $Y_{m-1}$ of the Booth's decoder 1 to which the host word $Y_{7-4}$ of the multiplicand is inputted.

In other words, the code of the host word $Y_{7-4}$ ($Y_H$=d) is reversed to $Y_H$=−d.

The operation of setting the first and fourth terms of equation (19) to "0" corresponds to the operation of setting the control signal $S_1$ of the internal of the multiplier to "0." At this time, the AND gates 7A and 7B output "0", and the selector 10 outputs the code bit $X_3$ of the lower word $X_L$ of the multiplier.

Therefore, "0" is inputted to each of the right and left inputs L and R of the Booth's selector 2 for generating the partial products $P_{03}$ to $P_{00}$ and $P_{13}$ to $P_{10}$ corresponding to $X_L Y_L$=bc. Also, code bit $X_3$ is inputted to each of the right and left inputs L and R of the selector 2 of the Booth's for generating the partial products $P_{28}$ to $P_{24}$ and P 38 to $P_{34}$ corresponding to $X_H Y_H$=a(−d).

Moreover, in place of $Y_3$, "1" is inputted to the least significant bit input $Y_{m-1}$ of the Booth's decoder to which the host words $Y_7$ to $Y_4$ of the multiplicand are inputted. Therefore, the host word $Y_H$=d of the multiplicand and the lower word $Y_L$=c are decoded as an independent four bit value.

As a result, the first and fourth terms of equation (7), that is, the first and fourth terms of equation (19) become "0", and a value of equation (20) is outputted.

When input data is fixed-point data, the position of the decimal point of output data is placed between $Z_{10}$ and $Z_9$. When input data is integer data, the position of the decimal point of output data is placed between $Z_4$ and $Z_3$. If the number of bits of each word is larger than two bits, no overflow is generated.

[Imaginary part]

An imaginary part of the product can be calculated in the same manner as the embodiment of FIG. 6.

First of all, in equation (7), the multiplication is performed in the following condition (equation (15')).

$$X_H=a, X_L=b, Y_H=c, Y_L=d. \tag{15'}$$

As a result, the following equation (16') can be obtained.

$$Z=ac+ad+bc+bd \tag{16'}$$

If the first and fourth terms of equation (16') are set to "0" in the multiplier, the following equation (17') can be obtained and the imaginary part of the products of the complex numbers F and C are calculated.

$$(\text{Imaginary part}) \; Z=ad+bc \tag{17'}$$

In order to execute equation (15'), a is inputted to the host word $X_{7-4}$ of the multiplier, b is inputted to the lower word $X_{3-0}$ of the multiplier, c is inputted to the host word $Y_{7-4}$ of the multiplicand, and d is inputted to the lower word $Y_{3-0}$ of the multiplicand, respectively, as four bit data. Moreover, $S_2$ may be set to $S_2$="0."

If the control signal $S_2$ is set to "0", the exclusive OR gate 11 directly outputs the level of the lower word $Y_{3-0}$ of the multiplicand, and $S_2$="0" is inputted to the least significant bit $Y_{m-1}$ of the Booth's decoders 1C and 1D to which the lower word $Y_{3-0}$ of the multiplicand is inputted.

In other words, the code of the lower word $Y_{3-0}$ ($Y_L$=d) of the multiplicand is not reversed.

The operation of setting the first and fourth terms of equation (16') to "0" corresponds to the operation of setting the control signal $S_1$ of the internal of the multiplier to "0."

At this time, the AND gates 7A and 7B output "0", and the selector 10 outputs the code bit $X_3$ of the lower word $X_L$ of the multiplier. Therefore, "0" is inputted to both right and left inputs L and R of the Booth's selector 2 for generating the partial products $P_{03}$ to $P_{00}$ and $P_{13}$ to $P_{10}$ corresponding to $X_L Y_L$=bd. Also, code bit $X_3$ is inputted to both right and left inputs L and R of the Booth's selector 2 for generating the partial products $P_{28}$ to $P_{24}$ and $P_{38}$ to $P_{34}$ corresponding to $X_H Y_H$=ac.

Moreover, in place of $Y_3$, "0" is inputted to the least significant bit input $Y_{m-1}$ of the Booth's decoders 1A and 1B to which the host words $Y_H$ of the multiplicand is inputted. Therefore, the host word $Y_H$=c of the multiplicand and the lower word $Y_L$=d are decoded as an independent four bit value.

As a result, the first and fourth terms of equation (7), that is, the first and fourth terms of equation (16') become "0", and a value of equation (17') is outputted.

When input data is fixed-point data, the position of the decimal point of output data is placed between $Z_{10}$ and $Z_9$. When input data is integer data, the position of the decimal point of output data is placed between $Z_4$ and $Z_3$.

In this case, if the number of bits of each word is larger than two bits, no overflow is generated.

According to the present invention, the number of pairs of data to be multiplied is not limited to two pairs, and three or more pairs of data may be multiplied.

According to the multiplier of the present invention, since multiplication of a plurality of pairs of data can be performed at one time, not only normal multiplication but also the double precision multiplication, the inner product of the vector, and the complex multiplication can be performed by one multiplier.

In a case that the multiplier of the present invention is incorporated into the processor, the above all calculations can be performed by a single machine cycle, so that the number of steps of program can be reduced. Particularly, the number of steps can be reduced to about ½ of the conventional case in the signal processing program in which the calculation of the sum of product is mainly performed. Conversely, in a case where the calculation through put is the same, the machine cycle is set to be longer than the conventional case, and the consumption of the electrical power of the entire processor can be reduced. Particularly, in the digital signal processor in which the signal processing is dedicatedly performed, the consumption of the electrical power can be reduced to about ½ of the conventional case.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A multiplier using Booth's algorithm comprising: multiplicand dividing means for receiving a control signal, and a most significant bit of first bits, determined as a lower word, of a plurality of bits constituting a multiplicand, and for outputting, as an output signal, "0" or the most significant bit of the first bits on the basis of the control signal;

a first Booth's decoder for receiving and decoding the output signal of the multiplicand dividing means and second bits, determined as a host word, of a plurality of bits constituting the multiplicand, and for outputting results of the first decoding;

a second Booth's decoder for receiving and decoding "0" or the first bits, and for outputting results of the second decoding;

Booth's selectors each for receiving predetermined third bits of a plurality of bits constituting a multiplier, for selecting one bit of the third bits on the basis of the results of the first decoding and second decoding, and for outputting the selected bit as a partial product;

zeroising means for receiving the control signal and fourth bits, determined as a lower word, of a plurality of bits constituting the multiplier, and for compulsorily replacing predetermined first partial products of partial products generated by the Booth's selectors with "0", on the basis of the control signal; and bit extension means for receiving the control signal, a most significant bit of the fourth bits, and fifth bits, determined as a host word, of a plurality of bits constituting the multiplier, and for compulsorily replacing predetermined second partial products of the partial products generated by the Booth's selectors with the most significant bits of the fourth bits, on the basis of the control signal.

2. A multiplier using Booth's algorithm comprising:

multiplicand complementing means for receiving a first control signal and first bits, determined as a lower word, of a plurality of bits constituting a multiplicand, and for outputting the first bits or second bits obtained by reversing the first bits on the basis of the first control signal;

multiplicand dividing means for receiving a second control signal and a most significant bit of the first bits or a bit obtained by reversing the most significant bit, and for outputting, as an output signal, "0", the most significant bit of the first bits, or the bit obtained by reversing the most significant bit on the basis of the second control signal;

a first Booth's decoder for receiving and decoding the output signal of the multiplicand dividing means and third bits, determined as a host word, of a plurality of bits constituting the multiplicand, and for outputting results of the first decoding;

a second Booth's decoder for receiving and decoding the first control signal and the first bits or the second bits, and for outputting results of the second decoding;

Booth's selectors each for receiving predetermined fourth bits of a plurality of bits constituting a multiplier, for selecting one bit of the fourth bits on the basis of the results of the first decoding and second decoding, and for outputting the bit as a partial product;

zeroising means for receiving the second control signal and fifth bits, determined as a lower word, of a plurality of bits constituting the multiplier, and for compulsorily replacing predetermined first partial products of partial products generated by the Booth's selectors with "0", on the basis of the second control signal; and bit extension means for receiving the second control signal, a most significant bit of the fifth bits, and sixth bits, determined as a host word, of a plurality of bits constituting the multiplier, and for compulsorily replacing predetermined second partial products of the partial products generated by the Booth's selectors with the most significant bit of the fifth bits.

3. A multiplier using Booth's algorithm comprising:

reversing means for receiving a first control signal and first bits, determined as a host word, of a plurality of bits constituting a multiplicand, and for outputting, as an output signal, the first bits or second bits obtained by reversing the first bits on the basis of the first control signal;

multiplicand dividing means for receiving the first control signal, a second control signal, and a most significant bit of third bits, determined as a lower word, of a plurality of bits constituting the multiplicand, and for outputting "1" or the most significant bit of the third bits on the basis of the first and second control signals;

a first Booth's decoder for receiving and decoding the output signal of the reversing means and an output signal of the multiplicand dividing means, and for outputting results of the first decoding;

a second Booth's decoder for receiving and decoding "0" or the third bits, and for outputting results of the second decoding;

Booth's selectors each for receiving predetermined fourth bit, of a plurality of bits constituting a multiplier, for selecting one bit of the fourth bits on the basis of the results of the first decoding and second decoding, and for outputting the bit as a partial product;

zeroising means for receiving the second control signal and fifth bits, determined as a lower word, of a plurality of bits constituting the multiplier, and for compulsorily replacing predetermined first partial products of partial products generated by the Booth's selectors with "0" on the basis of the second control signal; and bit extension means for receiving the second control signal, a most significant bit of the fifth bits, and sixth bits, determined as a host word, of a plurality of bits constituting the multiplier, and for compulsorily replacing predetermined second partial products of the partial products generated by the booth's selectors with the most significant bit of the fifth bits on the basis of the second control signal.

* * * * *